United States Patent [19]

Jerabek et al.

[11] 4,017,438

[45] Apr. 12, 1977

[54] KETIMINE-BLOCKED PRIMARY AMINE GROUP-CONTAINING CATIONIC ELECTRODEPOSITABLE RESINS

[75] Inventors: Robert D. Jerabek, Glenshaw; Joseph R. Marchetti, Greensburg; Robert R. Zwack, New Kensington, all of Pa.

[73] Assignee: PPG Industries, Inc., Pittsburgh, Pa.

[22] Filed: Apr. 2, 1976

[21] Appl. No.: 672,902

Related U.S. Application Data

[60] Continuation-in-part of Ser. No. 533,418, Dec. 16, 1974, abandoned, which is a continuation of Ser. No. 400,304, Sept. 24, 1973, abandoned, which is a division of Ser. No. 203,875, Dec. 1, 1971, abandoned.

[52] U.S. Cl. ............... 260/29.2 EP; 106/308 M; 204/181; 260/29.2 TN; 428/418
[51] Int. Cl.² ............... C08G 51/24; C08G 30/08
[58] Field of Search ............ 260/2 EP, 2 N, 47 EP, 260/47 EN, 29.2 EP, 29.2 TN, 77.5 BP, 77.5 AQ, 77.5 AM, 2 BP; 204/181

[56] References Cited

UNITED STATES PATENTS

| | | | |
|---|---|---|---|
| 3,321,548 | 5/1967 | Sattler | 260/47 X |
| 3,378,600 | 4/1968 | Hodges et al. | 260/47 X |
| 3,397,178 | 8/1968 | Shackelford et al. | 260/47 |
| 3,547,886 | 12/1970 | Gardner, Jr. et al. | 260/47 |
| 3,679,564 | 7/1972 | Dowbenko et al. | 204/181 |
| 3,719,626 | 3/1973 | May | 260/29.2 |

FOREIGN PATENTS OR APPLICATIONS

| | | |
|---|---|---|
| 679,761 | 2/1964 | Canada ............ 204/181 |
| 905,725 | 12/1959 | United Kingdom |

*Primary Examiner*—Theodore E. Pertilla
*Attorney, Agent, or Firm*—William J. Uhl

[57] ABSTRACT

The pH, dispersibility and throw power of amine group-solubilized, epoxy resin-derived, cationic electrodepositable resins can be enhanced by the incorporation of primary amine groups into the resin molecule. The primary amine groups are incorporated by reacting certain polyamine compounds in which the primary amine groups are blocked by ketimine groups into the acid solubilizable, amine group-containing electrodepositable resins derived from epoxy group-containing resins.

6 Claims, No Drawings

KETIMINE-BLOCKED PRIMARY AMINE GROUP-CONTAINING CATIONIC ELECTRODEPOSITABLE RESINS

CROSS-REFERENCE TO RELATED APPLICATIONS

This application is a continuation-in-part of Application Ser. No. 533,418, filed Dec. 16, 1974, now abandoned which is a continuation of Application Ser. No. 400,304, filed Sept. 24, 1973, now abandoned, which, in turn, is a division of Application Ser. No. 203,985, filed Dec. 1, 1971, now abandoned.

STATE OF THE ART

Electodeposition of aqueous organic coatings has risen to industrial prominence in recent years. The process has many advantages, including uniformity and completeness of coating even or intricate shapes, labor savings and pollution abatement. Virtually any electrically conductive substrate may be coated; however, the process has been primarily employed to prime or one-coat ferrous metal substrates.

Particular interest has recently arisen in cationic electrodeposition coatings, that is, coatings which deposit on the cathode, since when the article is the cathode, there is greatly reduced metal ion dissolution, which phenomena cuases staining in certain anionic systems.

One route to cationic electrodepositable resins is the use of synthetic organic resins containing amine groups derived from epoxy group-containing resins which are solubilized through the use of an acid counter-ion. Typically, these amine groups are secondary or tertiary amine groups. However, due to the relatively weak nature of these amine groups, frequently problems have arisen in these systems. These problems include low pH, poor dispersibility, especially at low levels of theoretical neutralization.

Where the resins utilized in the preparation of amine-solubilized electrodepositable resins contain epoxy groups, it has heretofore been extremely difficult to incorporate primary amine groups into the resin molecule since these groups readily react with epoxy groups leading to markedly increased molecular weight, with loss of primary amine functionality, or gelation.

Also, when isocyanate groups are added, they likewise react rapidly with a primary amine functionality, thus removing the desired effect of free primary amine groups.

A number of amine groups-solubilized, epoxy group-containing, resin-derived, electrodepositable resins are known in the art. These include two-component cures as well as self-curing resins.

DESCRIPTION OF THE INVENTION

It has now been found that primary amine groups may be incorporated in virtually any amine group-solubilized, expoxy group-containing, resin-derived electrodepositable resin. This can be accomplished by reacting a portion of the epoxy groups with virtually any polyamine containing a secondary amine group and containing primary amine groups in which the primary amine groups are blocked by ketimine groups. The ketamine groups when contacted with water decompose to provide primary amine functionality.

The presence of primary amine groups in an acid neutralized, amine group-solubilized electrodepositable resin provides numerous benefits including increased system pH, greater dispersibility, especially at low levels of theoretical neutralization, higher throw power, and in cases where cure of the resin system occurs through amine groups, more rapid and complete cure.

Virtually any acid-neutralized, amine group-solubilized resin can be modified by the technique of this invention at a stage where the base epoxy resin retains epoxy functionality.

A number of acid-neutralized, amine group-solubilized, epoxy group-contaning, resin-derived, cationically electrodepositable resins are known in the art.

One such system is described in Application Ser. No. 193,590, filed Oct. 28, 1971, now abandoned, by Robert D. Jerabek, entitled "CATIONIC ELECTRODEPOSITABLE COMPOSITIONS", where the electrodepositable system comprises a capped or blocked organic polyisocyanate, an amine adduct of an epoxy group-containing resin and a catalyst for urethane formation.

The capped or blocked isocyanate which may be employed in these compositions may be any isocyanate where the isocyanate groups have been reacted with a compound so that the resultant caped isocyante is stable to hydroxyl or amine groups at room temperature but reactive with hydroxyl or amine groups at elevated temperatures, usually between about 200° F. (93° C.) and about 600° F. (316° C).

In the preparation of the blocked organic polyisocyanates, any suitable organic polyisocyanate may be used. Representative examples are the aliphatic compounds such as trimethylene, tetramethylene, pentamethylene, hexamethylene, 1,2-propylene, 1,2-butylene, 2,3-butylene, ethylidine and butylidene diisocyanates; the cycloalkylene compounds such as 1,3-cyclopentan, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethylmethane-2,2',5,5'-tetraisocyanate, the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers, may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like, and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene gylcol, polyoxydecamethylene gylcol, poyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like, with alkylene oxides such as ethylene oxide, propylene oxide, their mixtures, and the like.

Any suitable aliphatic, cycloaliphatic or aromatic alkyl monoalcohol may be used as a blocking agent in accordance with the present invention, such as, for example, lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethylene glycol monoethyl ether, glycol monobutyl ether and the like. Minor amounts of even higher molecular weight, relatively non-volatile monoalcohols may be used, if desired, to serve as plasticizers in the coating provided by this invention.

Additional blocking agents include tertiary hydroxyl amines such as diethylethanolamine and oximes such as methylethyl ketone oxime, acetone oxime and cyclohexanone oxime.

The organic polyisocyanate-blocking agent adduct is formed by reacting a sufficient quantity of blockig agent with the organic polyisocyanate to insure that no free isocyanate groups are present. The reaction between the organic polyisocyanate and the blocking agent is often exothermic; therefore, the polyisocyanate and the blockig agent are preferably admixed at temperatures no higher than 80° C. and, preferably, below 50° C. to minimize the exotherm effect.

As previously stated, the resin employed is a coating composition containing an aqueous dispersion prepared from a capped organic polyisocyanate and a resin which is an adduct of a primary and/or secondary amine with an epoxy group-containing resin to form a room temperature stable coating composition.

The epoxy material utilized to form the adduct can be any monomeric or polymeric compound or mixture of compounds having an average of one or more epoxy groups per molecule. The monoepoxides can be utilized but it is preferred that the epoxy compound be resinous and that the polyepoxide contain one or more epoxy groups per molecule. A particularly useful class of polyepoxides are the polyglycidyl ethers of polyphenols such as Bisphenol A. These can be produced, for example, by etherification of a polyphenol with epichlorohydrin or dichlorohydrin in the presence of an alkali. The phenolic compound may be, for example, bis(4-hydroxyphenyl)2,2-propane, 4,4'-dihydroxybenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-dihydroxynaphthylene, or the like. In many instances it is desirable to employ such polyepoxides having somewhat higher molecular weight and containing aromatic groups. These can be provided by reacting the diglycidyl ether above with a polyphenol such as Bisphenol A and then further reacting this product with epichlorohydrin to produce a polyglycidyl ether. Preferably the polyglycidyl ether of a polyphenol contains free hydroxyl groups in addition to epoxide groups.

While the polyglycidyl ethers of polyphenols may be employed per se, it is frequently desirable to react a portion of the reactive sites (hydroxyl or in some instances epoxy) with a modifying material to vary the film characteristics of the resin. The esterification of epoxy resins with carboxylic acid, especially fatty acids is well known in the art and need not be discussed in detail. Especially preferred are saturated fatty acids and especially pelargonic acid. Likewise the epoxy resin may be modified with isocyanate group-containing organic materials or other reactive organic materials.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins, for example, by oxygen and selected metal catalysts, by perbenzoic acids, by acetaldehyde monoperacetate, or by peracetic acid. Among such polyepoxides are the epoxy alicyclic ethers and esters which are well known in the art.

Other epoxy-containing compounds are resins including nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

As previously set forth, the epoxy-containing materials are reacted with an amine to form an adduct. The amine employed may be any primary or secondary amine, preferably a secondary amine. Preferably the amine is a water-soluble amino compound. Examples of such amines include mono- and dialkylamines such as methylamine, ethylamine, propylamine, butylamine, dimethylamine, diethylamine, dipropylamine, dibutylamine, methylbutylamine, and the like.

While in most instances reasonably low molecular weight amines may be employed, it is possible to employ higher molecular weight monoamines, especially where it is preferred that the molecule be flexibilized or further modified by the structure contributed by the amines. Likewise, a mixture of low molecular weight and high molecular weight amines may be employed to modify the resin properties.

Further, it is possible for the amines to contain other constituents so long as they do not interfere with the reaction of the amine and the epoxy group and are of the nature or employed under the conditions so that they do not gel the reaction mixture.

The reaction of the amine with the epoxy group-containing material takes place upon admixing the amine and the epoxy group-containing material. In fact, it may be exothermic. If desired, the reaction mixture, if necessary, may be heated to moderate temperature, that is, 50° C. to 150° C., although higher or lower temperatures may be used, depending on the desired reaction. It is frequently desirable, in any event, at the completion of the reaction to elevate the temperature at least slightly for a sufficient time to insure complete reaction.

The amount of amine reacted with the epoxy group-containing material is at least that amount sufficient to render the resin cationic in character, that is, transportable to the cathode when acid solubilized. In some instances, substantially all of the epoxy groups in the resin are reacted with an amine.

The polyisocyanate-blocking agent adduct is preferably admixed with the amine epoxy adduct in ratios of from about 0.5 to about 2.0 urethane groups for each hydroxyl group.

Another cationic system which can be modified by the semiketimines is described in application Ser. No. 193,591, filed Oct. 28, 1971, now abandoned, by Robert D. Jerabek and Joseph R. Marchetti entitled SELF-CROSSLINKING CATIONIC ELECTRODEPOSITABLE COMPOSITIONS, comprising the reaction product of an epoxy group-containing resin, a primary or secondary amine, and a partially-capped or blocked organic polyisocyanate and containing a catalyst for urethane formation.

The epoxy material may be any of those described above.

The partially- or semi-capped or blocked isocyanate which may be employed in preparing the compositions of the invention may be any polyisocyanate where a portion of the isocyanato groups have been reacted with a compound so that the resultant capped isocyanate portion is stable to hydroxyl or amine groups at room temperature but reactive with hydroxyl or amine groups at elevated temperatures, usually between about 200° F. (93° C.) and about 600° F. (316° C.). The semi-capped polyisocyanate employed should contain an average of about one free reactive isocyanate group.

In the preparation of the partially-blocked organic polyisocyanate, any suitable organic polyisocyanate may be used, such as the representative examples set forth above.

Preferably, the polyisocyanate employed should have isocyanate groups with varied reactivity to facilitate the partially-blocking reaction.

In addition, the organic polyisocyanate may be a prepolymer derived from a polyol including polyether polyol or polyester polyol such as those described above.

Any suitable aliphatic, cycloaliphatic or aromatic alkyl monoalcohol may be used as a blocking agent in accordance with the present invention, such as, for example, lower aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like; the aromatic alkyl alcohols, such as phenylcarbinol, methylphenylcarbinol, ethylene glycol monoethyl ether, ethylene glycol monobutyl ether, and the like. Minor amounts of higher molecular weight, relatively non-volatile monoalcohols may be used, if desired, to serve as plasticizers in the coatings provided by this invention.

Additional blocking agents include tertiary hydroxylamines such as diethylethanolamine and oximes such as methyl ethyl ketone oxime, acetone oxime and cyclohexanone oxime.

The semi-capped organic polyisocyanate is formed by reacting a sufficient quantity of capping agent with the organic polyisocyanate to provide a product having one free isocyanate group remaining. The reaction between the organic polyisocyanate and the blocking agent is generally exothermic. The polyisocyanate and the blocking agent are preferably admixed at low temperatures to promote isocyanate group selectivity. Usually temperatures of 10° C. or even lower can be employed and generally below about 30° C. and normally no higher than about 80° C.

As previously set forth, the epoxy-containing materials are reacted with an amine to form an adduct. The amine to form an adduct. The amine employed may be any primary or secondary amine, preferably a secondary amine. Preferably the amine is a water-soluble amino compound. Examples of such amines include mono- and dialkylamines such as methylamine, ethylamine, propylamine, butylamine, dimethylamine, diethylamine, dipropylamine, dibutylamine, methylbutylamine, and the like.

While in most instances reasonably low molecular weight amines may be employed, it is possible to employ higher molecular weight monoamines, especially where it is preferred that the molecule be flexibilized or further modified by the structure contributed by the amines. Likewise, a mixture of low molecular weight and high molecular weight amines may be employed to modify the resin properties.

Further, it is possible for the amines to contain other constituents so long as they do not interfere with the reaction of the amine and the epoxy group and are of the nature or employed under the conditions so that they do not gel the reaction mixture.

The epoxy containing material, the semi-capped isocyanate and the amine may be reacted in alternative order.

Where the epoxy group-containing materials also contain hydroxyl groups, for example, the higher polyglycidyl ethers of polyphenols, the epoxy may be first reacted with the semi-capped polyisocyanate. The portion reacted is not unduly critical. Preferably sufficient semicapped isocyanate is employed to provide an adequate number of crosslinking sites to provide a cured film. Usually about one-half of the available hydroxyl groups are reacted. The maximum amount reacted can be the equivalence of the total hydroxyl functionality together with half the epoxy functionality.

Preferably, this reaction is conducted at low or moderate temperatures, generally less than about 120° C. to preserve the capped isocyanate groups in order to avoid gelation and to retain latent cross-linking sites.

Usually the reaction is conducted in the presence of a catalyst for urethane formation at a temperature between about 60° C. and about 120° C. Temperatures of about 100° C. are commonly employed.

After the completion of the above reaction, the resulting product is then reacted with the amine. The reaction of the amine with the epoxy group-containing material takes place upon admixing the amine and the epoxy group-containing material. In fact, the reaction is frequently exothermic. If desired, the reaction mixture, if necessary, may be heated to moderate temperature, that is, 50° to about 130° C., care being taken to preserve the capped isocyanate groups previously added. It is frequently desirable in any event to elevate the temperature at least slightly for a sufficient time to insure complete reaction.

The amount of amine reacted with the epoxy group-containing material is at least that amount sufficient to render the resin cationic in character, that is, transportable to the cathode when acid solubilized. In some instances substantially all of the epoxy groups in the resin are reacted with an amine.

Alternatively, the epoxy group-containing material may first be reacted with the amine to form an amine-epoxy adduct.

The reaction of the amine with the epoxy group-containing material takes place upon admixing the amine and the epoxy group-containing material. In fact, it may be exothermic. If desired, the reaction mixture, if necessary, may be heated to moderate temperature, that is, 50° to 150° C., although higher or lower temperatures may be used, depending on the desired reaction. It is frequently desirable, in any event, at the completion of the reaction to elevate the temperature at least slightly for a sufficient time to insure complete reaction.

The amount of amine reacted with the epoxy group-containing material is at least that amount sufficient to render the resin cationic in character, that is, transportable to the cathode when acid solubilized. Preferably, substantially all of the epoxy groups in the resin are reacted.

Polyamine ketimine derivatives utilized in the formation of products of this invention are derived in turn from virtually any polyamine capable of reacting with an epoxy group and having one secondary amine group and containing primary amine groups. Preferred polyamines are the alkylene polyamines and the substituted alkylene polyamines. Especially preferred polyamines are selected from those having the following formula:

$$H_2NRNHRNH_2$$

where R is a difunctional aliphatic group containing from 2 to about 48 carbon atoms. R may represent the same or different radicals in any one polyamine compound. Inert or non-interfering groups may be present on the group R.

Particularly preferred polyamines are those having the formula set forth above wherein R is an aliphatic hydrocarbon group. It is still more preferred that R is an alkylene group of 2–6 carbon atoms.

Typical of the amines which may be used are diethylene triamine, etc., and the corresponding propylene, butylene, etc., amine. Other amines which may be employed include primary-secondary amines such as N-aminoethyl piperazine or amines corresponding to the formula:

$$RNH-R-NH_2.$$

The primary amine groups in the polyamine compounds are converted to ketimines by reaction with ketones. Such ketones may have the following structural formula:

$$O=C\begin{matrix}R_1\\R_2\end{matrix}$$

wherein $R_1$ and $R_2$ are organic radicals and are each substantially inert to the ketimine formation reaction. Preferably $R_1$ and $R_2$ are short chain alkyl groups (1 to 4 carbon atoms). It is often preferred to use a ketone which boils below or near the boiling point of water or which readily distills with water. The reaction of the ketone with the primary amine groups can be illustrated as follows:

$$m\text{-}NH_2 + O=C\begin{matrix}R_1\\R_2\end{matrix} \xrightarrow{\Delta} m\text{-}N=C\begin{matrix}R_1\\R_2\end{matrix} + H_2O \uparrow$$

Preferred examples of ketones include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone, acetophenone, and the like. Especially preferred ketones are acetone, methyl ethyl ketone and methyl isobutyl ketone.

As previosly stated, the secondary amine groups containing ketimine may be reacted with the base electrodepositable resin at any stage where free epoxy groups remain in the molecule.

The reaction of the amine with the epoxy group-containing material takes place upon admixing the amine and the epoxy group-containing material. In fact the reaction is frequently exothermic. If desired, the reaction mixture, if necessary, may be heated to moderate temperature, that is, about 50° to about 130° C., care being taken to preserve the ketimine groups and blocked isocyanate groups present. It is frequently desirable, in any event, to elevate the temperature at least slightly for a sufficient time to insure complete reaction.

Subsequent to the reaction, the resultant resin should not be exposed to conditions which will decompose the ketimine groups to generate free prlmary amine groups until the possibility of gelation or crosslinking with the primary amine grOups does not exist. The ketimine will decompose upon aqueous dispersion.

Generally, the ratio of urethane to hydroxyl groups in the final aqueous dispersion is from about 0.5 to about 2.0 isocyanate groups for each hydroxyl group.

It is usually necessary, in order to insure rapid and complete curing of the polymers of the invention, to have present in the coating mixture a catalyst for urethane formation. The tin compounds such as dibutyltin dilaurate and dibutyltin diacetate are preferred, but other catalysts for urethane formation known in the art may be employed. The amount of catalyst employed is that amount which effectively promotes reaction of the deposited film, for example, amounts varying from about 0.5 percent to about 4 percent by weight of the polymer may be employed. Typically about 2 percent by weight is employed.

The polymer of the invention and catalyst mixture is electrodeposited on a suitable substrate and cured at elevated temperatures, such as from about 250° F. (121° C.) to about 600° F. (316° C.), the film curing at least in part through urethane crosslinks. The capping agent released may either volatilize or remain in the mixture as a plasticizer, depending essentially on its boiling point.

Aqueous compositions containing the above components are highly useful as coating compositions, particularly suited to application by electrodeposition, although they may also be applied by conventional coating techniques. It is necessary to add a neutralizing agent to obtain a suitable aqueous composition. It is desirable to electrodeposit these coatings from a solution having a pH between about 3 and about 9.

Neutralization of these products is accomplished by the reaction of all or part of the amino groups by water-soluble acid, for example, formic acid, acetic acid, or phosphoric acid, or the like. The extent of neutralization depends upon the particular resin and it is only necessary that sufficient acid be added to solubilize or disperse the resin.

Electrodepositable compositions while referred to as "solubilized" in fact are considered a complex solution, dispersion or suspension or combination of one or more of these classes in water, which acts as an electrolyte under the influence of an electric current. While no doubt in some instances the resin is in solution, it is clear that in some instances and perhaps in most, the resin is a dispersion which may be called a molecular dispersion of molecular size between a colloidal suspension and a true solution.

The concentration of the product in water depends upon the process parameters to be used and is in general not critical, but ordinarily the major proportion of the aqueous composition is water, e.g., the composition may contain one to 25 percent by weight of resin. In most instances, a pigment composition and, if desired, various additives such as anti-oxidants, surface-active agents, coupling solvents, and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, and the like.

In electrodeposition processes employing the aqueous coating compositions described above, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically conductive substrate, and especially metals such as steel, aluminum, copper, or the like.

After deposition, the coating is cured at elevated temperatures by any convenient method, such as in baking ovens or with banks of infrared heat lamps. Curing temperatures are preferably from about 350° F. (177° C.) to about 425° F. (218° C.), although curing temperatures from about 250° F. (121° C.) to about 500° F. (260° C.), or even 600° F. (316° C.) may be employed, if desired.

Illustrating the invention are the following examples, which, however, are not construed as limiting the invention to their details. All parts and percentages in the examples, as well as throughout this specification, are by weight unless otherwise specified.

EXAMPLE A

A cationic pigment dispersant was prepared by heating 746.2 parts of stearyl glycidyl ether (Proctor & Gambles's Epoxide 45) and 224 parts of ethylene glycol monobutyl ether to about 50° C. and adding 150.2 parts of n-methyl ethanolamine over a 30-minute period with external cooling to keep the batch temperature below 100° C. When all the amine was added, the batch was held an additional hour at 100° C. before cooling and storage.

To prepare a grinding vechicle from this cationic pigment dispersant, 200 parts were blended with 38.5 parts of 88 percent lactic acid and 515 parts of deionized water.

To prepare a pigment paste, 90 parts of this grinding vehicle was blended with four parts of acetylenic alcohol defoamer (Surfynol 104-A), 60 parts of phthalocyanine blue, 140 parts of iron oxide brown and 306 parts of deionized water, and the resultant slurry ground in a suitable mill to a Hegman No. 7.

EXAMPLE I

An amine-epoxy adduct was prepared as follows:
One thousand eight hundred thirty parts of polyglycidyl ether of Bisphenol A (Epon 1004) possessing an epoxy equivalent weight of 915 were dissolved in 353.2 parts of methyl butyl ketone by heating to reflux at 130° C. with agitation in order to remove any water present by use of a decanting trap in the distillate return line. Upon cooling to 80° C. under a dry nitrogen blanket, 52 parts of the diketimine derived from one mole of diethylene triamine and 2 moles of methyl isobutyl ketone (as described in U.S. Pat. No. 3,523,925) and 138.8 parts diethylamine were added and the batch heated to 120° C. where it was held approximately two hours and then thinned with 326 parts of propylene glycol monomethyl ether. The resultant polytertiary amine cationic resin-containing potential primary amine groups (to be generated from the ketimine moiety upon water addition) was stored for subsequent use. This product was identified as Adduct C.

In order to prepare a reactive cationic plasticizer, the 2-ethylhexanol monourethane of 2,4-toluene diisocyanate was first prepared by adding 1953 parts of 2-ethylhexanol to 2610 parts of 2,4-toluene diisocyanate and 200 parts methyl butyl ketone over a 5-hour period with agitation and external cooling to maintain the batch reaction temperature below 20° C. The batch was then thinned with 100 parts of methyl butyl ketone and stored under dry nitrogen.

In another reactor, 456 parts of the above 2-ethylhexanol monourethane of 2,4-TDI (1.5 equivalents of free isocyanate) was added to 769.5 parts (1.5 equivalents) of polyoxypropylene diamine (Jefferson Jeffamine D-1000) possessing an amine equivalent weight of 512 over a 20-minute period at 40° C., and then thinned with 189 parts of methyl butyl ketone to yield a reactive cationic plasticizer of 85.2 percent nonvolatile content.

In another reactor, the 2-ethylhexanol diurethane of 80/20 2,4-2,6-toluene diisocyanate was prepared by slowly adding 87.1 parts of 80/20 2,4-2,6-TDI to 143 parts of 2-ethylhexanol containing one drop of dibutyltin dilaurate with external cooling to maintain the reaction mixture below 100° C.

To prepare an electrodepositable thermosetting cationic urethane composition, 741 parts of the above polytertiary amine cationic resin (Adduct C), 57 parts of ethylene glycol monohexyl ether, 134 parts of the above reactive cationic plasticizer, 231 parts of the above 2-ethylhexanol diurethane and 18 parts dibutyltin dilaurate catalyst were blended and then solubilized with 46 parts 88 percent lactic acid and 1773 parts deionized water.

To pigment this composition, 1216 parts of it were blended with 247 parts of the pigment paste described in Example A, and the batch thinned to about 12 percent non-volatile content with 2337 parts of deionized water.

This electrodeposition bath showed a pH of 6.0 and 2 minute throw power of 10 inches at 280 volts. Films deposited cathodically for 2 minutes at 280 volts on zinc phosphated steel and baked 45 minutes at 350° F. (177° C.) yielded smooth, hard flexible films of 0.5 mil thickness.

EXAMPLE II

A 2-ethylhexanol monourethane of 2,4-toluene diisocyanate sample was prepared by adding 651 parts of 2-ethylhexanol to an agitated mixture of 870 parts of 2,4-TDI and 100 parts methyl butyl ketone over approximately 3 hours, with external cooling to maintain the reaction temperature below 18° C. After addition was complete, the batch was agitated an additional 2 hours and stored under dry nitrogen for subsequent use.

A self-crosslinking, cationic polyurethane containing free primary amine groups was then prepared by first dissolving 700 parts of polyglycidyl ether of Bisphenol A (Epon 1001) possessing an equivalent weight of 492 per epoxide group, in 153.7 parts of methyl butyl ketone and refluxing about 20 minutes to remove any water present, by use of a decanting trap in the distillate return line. After cooling to 80° C., 598.3 parts of the above 2-ethylhexanol monourethane of 2,4-toluene diisocyanate was added and the batch reheated to 90°–95° C. and held for about one hour, then heated to 120°–125° C. and held about 1½ hours, until all NCO was found to have reacted, as indicated by an infrared scan.

The batch was cooled to 100° C. and 73.8 parts of the diketimine derived from one mole of diethylene triamine and 2 moles of methyl isobutyl ketone (Shell Chemical Co. curing agent H-1) was added, followed by 93.6 parts of diethylamine. The batch was then heated to 120° C. and held for one hour at which time 193 parts monohexyl ether of ethylene glycol was introduced.

Into a separate agitated container was blended 1445 parts of water and 76 parts of 88 percent aqueous lactic acid, after which 1432 parts of the above hot resin was slowly blended in. When cooled to approximately 110° C., 29 parts of dibutyltin dilaurate were added and the resultant 44.4 percent solids aqueous dispersion stored for subsequent use.

A cationic resin for pigment dispersion was prepared by dissolving 500 parts of polyglycidyl ether of Bisphenol A (Epon 1001) possessing an epoxide equivalent weight of 500, in a blend of 96 parts butanol and 96 parts of the monobutyl ether of ethylene glycol by heating to 55° C. with agitation and then introducing 73.1 parts of diethylamine. The batch was heated to 100° to 110° C. and held 2¾ hours and then stored for subsequent solubilization. For pigment grinding, 200 parts of this resin were solubilized by blending with 36 parts of 88 percent lactic acid and 273 parts of deionized water. To 73.2 parts of this solubilized pigment grinding resin was added 4.8 parts of acetylenic alcohol defoamer (Surfynol 104-A), parts phthalocyanine blue, 162 parts iron oxide brown and 383 grams of deionized water, and the resultant pigment slurry ground in a steel ball mill.

A pigmented primary amine-containing self-crosslinking, cationic electrodepositable composition was prepared by blending 221 parts of the above pigment paste with 839 parts of the above 44.4 percent solids cationic urethane resin dispersion and 2740 parts of deionized water. This composition displayed a solids content of about 12 percent, a pH of 5.7 and a conductivity of 1165 mmhos./cm.

When cathodically deposited upon zinc phosphatized steel, a (Ford) throw of 9⅝ inches in 2 minutes at 320 volts was displayed. Panels similarly coated and baked 20 minutes at 400° F. (204° C.) showed a film thickness of 0.45 mils, a pencil hardness of 6H and no scribe creepage after an exposure of 14 days to salt fog.

EXAMPLE III

A 2-ethylhexanol monourethane of 2,4-toluene diisocyanate was prepared by adding 1953 parts of 2-ethylhexanol to an agitated mixture of 2610 parts of 2,4-TDI and 200 parts of methyl butyl ketone over approximately a 3 hour period with external cooling to maintain the reaction temperature below 18° C. After the addition was completed, the product was stored under dry nitrogen for subsequent use.

A self-crosslinking cationic polyurethane containing free primary amine groups was prepared by first dissolving 700 parts of polyglycidyl ether of Bisphenol A (Epon 1001) possessing an equivalent weight of 492 per epoxide group, in 150 parts of methyl butyl ketone, and refluxing about 30 minutes at 130° C. to remove any water present by use of a decanting trap in the distillate return line. After cooling to 100° C. 598.3 parts of the above 2-ethylhexanol monourethane of 2,4-toluene diisocyanate was added along with ten drops of dibutyltin dilaurate.

The batch was heated to 120° C. and held about 35 minutes, at which time 143.2 parts of ethylene glycol monohexyl ether were added, followed by 96.1 parts of n-methyl ethanolamine and 73.8 parts of the diketimine from one mole of diethylene triamine and 2 moles of methyl isobutyl ketone (Shell Chemical Co. curing agent H-1). The batch was held at 100° C. for about two hours, at which time 1400 parts of it were poured into an agitated vessel containing 831 parts of deionized water and 72 parts of 88 percent lactic acid. After cooling to 110° F. (43° C.), 23 parts of dibutyltin dilaurate were added to the mixture and it was thinned for subsequent use to 40 percent non-volatile content with 582 parts of deionized water.

A cationic pigment dispersant was prepared by heating 746.2 parts of stearyl glycidyl ether (Proctor & Gamble's Epoxide 45) and 224 parts of ethylene glycol monobutyl ether to about 50° C. and adding 150.2 parts of n-methyl ethanolamine over a 30-minute period with external cooling to keep the batch temperature below 100° C. When all the amine was added, the batch was held an additional hour at 100° C. before cooling and storage. To prepare a grinding vehicle from this cationic pigment dispersant, 200 parts were blended with 38.5 parts of 88 percent lactic acid and 515 parts of deionized water. To prepare a pigment paste 90 parts of this grinding vehicle were blended with 4 parts of acetylenic alcohol defoamer (Surfynol 104-A), 60 parts of phthalocyanine blue, 140 parts of iron oxide brown, and 306 parts of deionized water, and the resultant slurry ground in a steel ball mill.

A pigmented, self-crosslinking cationic, primary amine-containing, electrodepositable composition was prepared by blending 228 parts of the above paste with 930 parts of the above 40 percent non-volatile cationic resin dispersion and reducing with 2642 parts of deionized water. This coating bath showed a pH of 6.4, a conductivity of 1510 mmhos./cm., and a 2 minute throw power (Ford) of 8½ inches at 250 volts.

Films deposited cathodically for two minutes at 250 volts on zinc phosphated steel panels showed 0.4 mil film thickness after curing 20 minutes at 400° F. (204° C.) and showed no scribe creepage when exposed to salt fog at 100° F. (38° C.) for two weeks.

EXAMPLE IV

A polyglycidyl ether-amine adduct was prepared as follows:

Into a suitable reactor were charged 105 parts by weight of a polyglycidyl ether derived from the condensation of Bisphenol A and epichlorohydrin, possessing an epoxy equivalent weight of about 198 (Epon 829) and 28 parts by weight of Bisphenol A. The charge was agitated and heated to an exotherm at 280° F. (138° C.) and allowed to exotherm freely for about ½ hour, the top temperature reaching 350° F. (177° C.). The mixture was then cooled to 250° F. (121° C.) and 119.7 parts by weight of a ketimine, derived from one equivalent of N-coco-1,3-diaminopropane (DUOMEEN CD commercially available from Armour Industrial Chemical Co.) and one equivalent of methyl normal butyl ketone, was charged to the reaction vessel.

After the ketimine was added to the reaction mixture, the mixture was heated to 285° F. (141° C.) and held at this temperature for 2 hours. The reaction mixture was then cooled to 270° F. (132° C.) and 43.7 parts by weight of ethylene glycol monoethyl ether was added to the reaction mixture.

In another reactor, a triurethane of a trifunctional aliphatic isocyanate commercially available from Mobay Chemical Company under the trademark DE-SMODUR N-100 capped with methyl ethyl ketoxime was prepared as follows: 3550 parts by weight of the trifunctional aliphatic isocyanate and 1182.5 parts by weight of methyl normal butyl ketone were charged to the reactor. One thousand eight hundred fifteen parts by weight of the methyl ethyl ketoxime was slowly added to the triisocyanate with cooling, keeping the reaction temperature below 40° C. Addition took about 1½ hours. The cooling was removed and the batch held until an infrared analysis indicated that the reaction mixture was free of unreacted NCO groups.

To prepare an electrodepositable thermosetting resin cationic urethane composition, 266 parts of the above-described polyglycidyl ether amine adduct was blended with 157 parts by weight of the above ketoxime blocked polyisocyanate. The mixture was neutralized with 19.7 grams of glacial acetic acid.

A pigment paste was prepared by blending together 202 parts of the above-described polyglycidyl ether amine adduct, 98 parts by weight of methyl ethyl ketone, 194 parts by weight of $TiO_2$, 1.9 parts by weight of carbon black, 50.1 parts by weight of clay, 36 parts by weight of lead silicate and 18 parts by weight of strontium chromate. The resultant blend was ground in a suitable mill to a Hegman No. 7 particle size. Two hundred twenty-eight parts by weight of the pigment paste was then combined with the cationic urethane composition prepared as described above and with 929 parts by weight of deionized water in a Cowles mixer, after which the mixture was thinned with 2200 parts by weight of deionized water to form a 13 percent solids solution having a pH of 6.5. A zinc phosphated steel panel was cathodically coated by this bath, the bath being at room temperature, using 100 volts for 2 minutes. The resultant panel, after curing for 20 minutes at 325° F. (163° C.) displayed a smooth, acetone-resistant film.

In the manner of the above examples, various other epoxycontaining materials, ketimines, adjuvants and conditions within the scope of the above descriptions may be substituted to achieve similar results.

According to the provisions of the Patent Statutes, there are described above the invention and what are now considered to be its best embodiments. However, within the scope of the appended claims, it is to be understood that the invention may be practiced otherwise than as specifically described.

We claim:
1. An aqueous electrodepositable composition comprising an uncrosslinked acid-neutralized, amine group-containing, synthetic organic resin, wherein said organic resin contains hydroxyl groups curable through urethane group crosslinking, wherein at least a portion of said amine groups are primary amine groups and wherein said organic resin is formed from reacting:
   A. a polyepoxide containing 1,2-epoxy functionality,
   B. a polyamine derivative having at least one primary amine group which is blocked by a ketimine group and having a secondary amine group.
2. The aqueous electrodepositable composition of claim 1 wherein said polyamine derivative is a diketimine derived from one mole of diethylene triamine and two moles of methyl isobutyl ketone.
3. The aqueous electrodepositable composition of claim 1 wherein said organic resin further contains capped isocyanate groups stable at room temperature in the presence of hydroxyl or amine groups and reac- tive with hydroxyl groups and amine groups at elevated temperatures.

4. The aqueous electrodepositable composition of claim 1 wherein said polyamine derivative is a diketimine derived from one mole of N-coco-1,3-diaminopropane and one mole of methyl isobutyl ketone.

5. An aqueous electrodepositable composition comprising an uncrosslinked acid-neutralized, amine group-containing synthetic organic resin wherein said organic resin contains hydroxyl groups curable through urethane group crosslinking, wherein at least a portion of said amine groups are primary amine groups and wherein said organic resin is formed from reacting:

A. a polyepoxide containing 1,2-epoxy functionality,
B. a primary or secondary amine which is different from (C),
C. a polyamine derivative containing at least one latent primary amine group which is blocked by a ketimine group and having one or more secondary amine groups.

6. The aqueous electrodepositable composition of Claim 5 wherein said organic resin further contains capped isocyanate groups stable at room temperature in the presence of hydroxyl or amine groups and reactive with hydroxyl and amine groups at elevated temperatures.

* * * * *

UNITED STATES PATENT AND TRADEMARK OFFICE
CERTIFICATE OF CORRECTION

PATENT NO. : 4,017,438
DATED : April 12, 1977
INVENTOR(S) : Robert D. Jerabek, Joseph R. Marchetti and Robert R. Zwack It is certified that error appears in the above-identified patent and that said Letters Patent are hereby corrected as shown below:

Column 1, line 12, "203,985" should be --203,875--.

Column 1, line 19, "or" should be --on--.

Column 1, line 28, "cuases" should be --causes--.

Column 2, line 35, insert --1,3-butylene,-- after "lene,".

Column 2, line 36, "1,3-cyclopentan" should be --1,3-cyclopentane--.

Column 3, line 4, "gylcol" should be --glycol--.

Column 3, line 4, "poyox-" should be --polyox- --.

Column 3, line 25, insert --ethylene-- before "glycol".

Column 3, line 28, "coating" should be --coatings--.

Column 3, line 35, "blockig" should be --blocking--.

Column 3, line 40, "blockig" should be --blocking--.

Column 6, lines 29-30, delete "The amine to form an adduct.".

Column 8, line 46, insert --C.-- after "50°".

Column 8, line 54, "prImary" should be --primary--.

Column 8, line 56, "grOups" should be --groups--.

Column 9, line 38, "Of" should be --of--.

UNITED STATES PATENT AND TRADEMARK OFFICE
CERTIFICATE OF CORRECTION

PATENT NO. : 4,017,438
DATED : April 12, 1977
INVENTOR(S) : Robert D. Jerabek, Joseph R. Marchetti and Robert R. Zwack It is certified that error appears in the above-identified patent and that said Letters Patent are hereby corrected as shown below:

Column 12, line 27, insert --72-- before "parts".

Column 13, line 2, insert --derived-- before "from".

Signed and Sealed this fifth Day of July 1977

[SEAL]

Attest:

RUTH C. MASON
*Attesting Officer*

C. MARSHALL DANN
*Commissioner of Patents and Trademarks*